United States Patent
Gandini

(10) Patent No.: US 8,747,075 B1
(45) Date of Patent: Jun. 10, 2014

(54) FLUID LEVEL MANAGEMENT

(76) Inventor: Nicola Gandini, La Maddalena (IT)

( * ) Notice: Subject to any disclaimer, the term of this patent is extended or adjusted under 35 U.S.C. 154(b) by 498 days.

(21) Appl. No.: 13/104,687

(22) Filed: May 10, 2011

Related U.S. Application Data

(60) Provisional application No. 61/334,014, filed on May 12, 2010.

(51) Int. Cl.
*F04B 49/00* (2006.01)
*F04B 49/10* (2006.01)

(52) U.S. Cl.
USPC .................. 417/32; 417/39; 417/53; 119/247

(58) Field of Classification Search
USPC ............ 417/32, 36, 39, 41, 53; 119/245, 247
See application file for complete search history.

(56) References Cited

U.S. PATENT DOCUMENTS

| | | | | |
|---|---|---|---|---|
| 1,942,241 | A | * | 1/1934 | Duhme ........................... 417/36 |
| 3,511,376 | A | * | 5/1970 | Sesholtz ................... 210/167.25 |
| 5,473,837 | A | | 12/1995 | Skoczylas et al. |
| 5,881,753 | A | | 3/1999 | Bowling |
| 6,535,134 | B2 | | 3/2003 | Lang et al. |
| 6,565,330 | B1 | * | 5/2003 | Bresolin ........................ 417/313 |
| 7,134,293 | B2 | * | 11/2006 | Rabal .............................. 62/185 |
| 7,222,047 | B2 | * | 5/2007 | McMillan et al. ............ 702/182 |
| 7,654,278 | B2 | | 2/2010 | Schultink |
| 8,032,256 | B1 | * | 10/2011 | Wolf et al. .................... 700/281 |
| 2001/0035826 | A1 | | 11/2001 | Lang et al. |
| 2009/0288712 | A1 | | 11/2009 | Lang et al. |

OTHER PUBLICATIONS

National Semiconductor, "LM35 Precision Centigrade Temperature Sensors," Nov. 2000 (13 pgs).
National Semiconductor, "LM34/LM35 Precision Monolithic Temperature Sensors," Oct. 1986 (13 pgs).

* cited by examiner

*Primary Examiner* — Peter J Bertheaud
(74) *Attorney, Agent, or Firm* — K&L Gates LLP

(57) ABSTRACT

Fluid level in an aquarium or other container containing a fluid is managed using a mounted fluid level sensor that includes a heating element mounted to a heat conductive sensor housing and a temperature sensor mounted to the housing at a location spaced from the heating element. A controller collects temperature readings from the temperature sensor and operates a pump to add fluid to the container when temperature readings from the fluid level sensor housing exceed a threshold temperature for a prescribed period of time, representing a drop in fluid level in the container. The controller can include a pump control unit that controls operation of the pump and a microprocessor configured to receive temperature readings from the temperature sensor, control the temperature of the heating element, and control the pump control unit based on the temperature readings received from the temperature sensor.

15 Claims, 4 Drawing Sheets

Figure 3B

| | | | | |
|---|---|---|---|---|
| 1 | 3 | C1 | 470uF | anti spikes |
| | | C3 | 470uF | anti spikes |
| | | C5 | 470uF | anti spikes |
| 2 | 3 | C2 | 0.1uF | anti spikes |
| | | C4 | 0.1uF | anti spikes |
| | | C6 | 0.1uF | anti spikes |
| 3 | 2 | D2 | LM35D | Temp to voltage converter |
| 4 | 2 | D7 | 1N4007 | anti spikes |
| | | D1 | 1N4007 | anti spikes |
| 5 | 2 | D3 | 1N4148 /1N4007 | reset on power |
| | | D8 | 1N4148 /1N4007 | protector |
| 6 | 1 | D4 | Verde livello ok | level led |
| 7 | 1 | D5 | Pompa giallo | pump in progress |
| 8 | 1 | D6 | Alarm Rosso | Alarm |
| 9 | 6 | JP1 | JUMPER | Program connector |
| | | JP2 | JUMPER | Program connector |
| | | JP3 | JUMPER | Program connector |
| | | JP4 | JUMPER | Program connector |
| | | JP5 | JUMPER | Program connector |
| | | JP6 | JUMPER | Program connector |
| 11 | 1 | JP7 | Usb M | |
| 12 | 1 | JP8 | Usb F | |
| 13 | 2 | JP10 | HEADER 2 | |
| | | JP9 | HEADER 2 | |
| 14 | 1 | M1 | MOTOR DC | Pump |
| 15 | 1 | Q1 | npn | Cut off over 60 °C |
| 16 | 1 | Q2 | Mosfet ch N | power driver |
| 17 | 2 | R6 | 0 | Future |
| | | R1 | 0 | Future |
| 18 | 4 | R1 | 470 | |
| | | R2 | 470 | |
| | | R4 | 470 | |
| | | R5 | 470 | |
| 19 | 1 | R2 | 100 | |
| 20 | 4 | R3 | 10K | |
| | | R7 | 10K | |
| | | R8 | 10K | |
| | | R9 | 10K | |
| 21 | 1 | R10 | 2k2 | |
| 22 | 2 | R12 | 1K | |
| | | R11 | 1K | |
| 23 | 1 | R13 | 4R7 3/5 W | |
| 24 | 2 | R14 | 4K7 | |
| | | R15 | 4K7 | |
| 25 | 1 | S1 | Manual | Manual switch |
| 26 | 1 | U1 | UA7812 | First stabilizer |
| 27 | 1 | U2 | UA78L05 | Second stabilizer |
| 28 | 1 | U3 | 12F675 | Microprocessor |

US 8,747,075 B1

FLUID LEVEL MANAGEMENT

CROSS-REFERENCE TO RELATED APPLICATIONS

This application claims priority to and the benefit of United States Provisional Patent Application entitled, "Fluid Level Management" having U.S. Ser. No. 61/334,014, filed on 12 May 2010, which is incorporated by reference (including all Appendices) in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems, apparatus, etc. for managing the level of fluid in an aquarium. Several embodiments specifically address use of an off-the-shelf sensor device coupled to a microprocessor or the like.

2. Description of Related Art

Many aquaria use some sort of water level system that helps "top off" aquaria that lose water through evaporation or otherwise. Most of these use a mechanical float switch that changes physical position as the aquarium's water level changes. Another system is disclosed in U.S. Pat. No. 6,535,134 B2, issued to Lang et al. on Mar. 18, 2003, entitled "Method for the generation of an electrical signal sensor device for executing the method and the use of the sensor device" which is incorporated herein by reference in its entirety for all purposes. Lang et al. use a complex heater/sensor device that is a high cost item. Systems, apparatus, techniques, etc. that provide improved water level detection and control without the need for expensive sensors and/or mechanical devices would represent a significant advancement in the art.

SUMMARY

Fluid level is managed using a fluid level sensor mounted to an aquarium or other container containing a fluid such as water. The fluid level sensor includes a heating element mounted to a heat conductive fluid level sensor housing and a temperature sensor mounted to the fluid level sensor housing at a location spaced from the heating element. A fluid pump delivers fluid to the container (in some cases in specific ways that limit the chances of overflow and/or other problems). A controller collects temperature readings from the temperature sensor and operates the pump to add fluid to the container when a preselected number of temperature readings from the fluid level sensor housing exceed a prescribed threshold temperature for a prescribed period of time. An elevated temperature from the fluid level sensor housing represents a drop in fluid level in the container. The heating element temperature can be controlled to achieve desired operational characteristics. The temperature reading of the fluid level sensor provides an indication of the level of fluid being measured based at least in part on one or more of the following: the heating/cooling properties of the fluid being measured, the heating/cooling properties of the fluid level sensor housing, the surface area of the fluid level sensor's housing that is covered by fluid and/or the surface area of the fluid level sensor's housing that is not covered by fluid. The controller can also include a pump control unit that controls operation of the pump to deliver fluid water to an aquarium and a microprocessor configured to receive temperature readings from the temperature sensor, control the temperature of the heating element, and control the pump control unit based on the temperature readings received from the temperature sensor.

BRIEF DESCRIPTION OF THE DRAWINGS

The present invention will be readily understood by the following detailed description in conjunction with the accompanying drawings, wherein like reference numerals designate like structural elements, and in which:

FIG. 3B is an exemplary component listing of the components of the schematic diagram of FIG. 3A.

DETAILED DESCRIPTION

Figure 1:
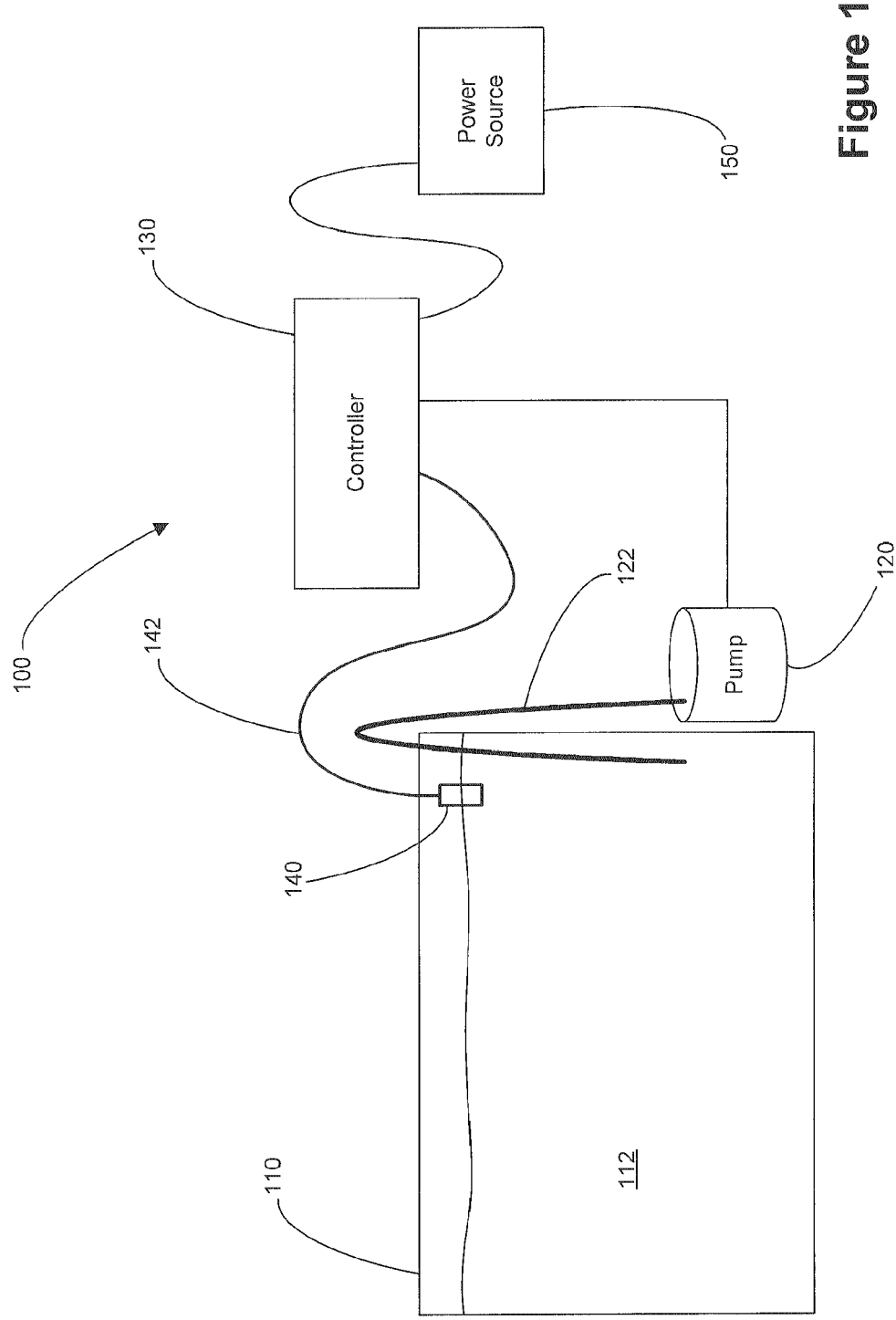
FIG. 1 is a diagram of a fluid level management apparatus coupled to an aquarium.

The following detailed description of the invention, including the Figures, will refer to one or more embodiments used for fluid level management, but the invention not limited to such embodiments. Rather, the detailed description is intended only to be illustrative. Those skilled in the art will readily appreciate that the detailed description given with respect to the Figures is provided for explanatory purposes as the invention extends beyond such specific embodiments. Embodiments of the invention provide fluid level management devices, methods, apparatus, techniques, etc. that provide inexpensive and simple implementations for non-mechanical management of fluid levels, for example the water level in an aquarium. Examples of the present invention will be shown and explained primarily in connection with such aquarium water level management systems and the like for illustrative purposes, but the invention not limited to such uses and locations. Other settings and uses will be apparent to those skilled in the art after considering the following disclosure and the Figures provided herewith.

Certain terms are used throughout the description and claims to refer to particular system components and/or relationships of components and/or features. As one skilled in the art will appreciate, various companies, individuals, etc. may refer to components by different names. This disclosure does not intend to distinguish between components that differ insubstantially. Also, phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate and unless the context clearly dictates otherwise. The term "system" refers broadly to a collection of two or more components and may be used to refer to an overall system (e.g., a computer system, a sensor system, a network of sensors and/or computers, etc.), a subsystem provided as part of a larger system (e.g., a subsystem within an individual computer and/or detection system, etc.), and/or a process or method pertaining to operation of such a system or subsystem.

In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein. Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases and the like appearing in various places throughout the specification are not necessarily all referring to the same embodiment. In the following detailed description, references are made to the accompanying drawings that form a part thereof, and are shown by way of illustrating specific embodiments in which the invention may be practiced. These embodiments are described in sufficient detail to enable those skilled in the art to practice the invention, and it is to be understood that other embodiments may be utilized and that structural, logical, electrical and/or other changes can be made without departing from the spirit and scope of the present invention.

Figure 2:
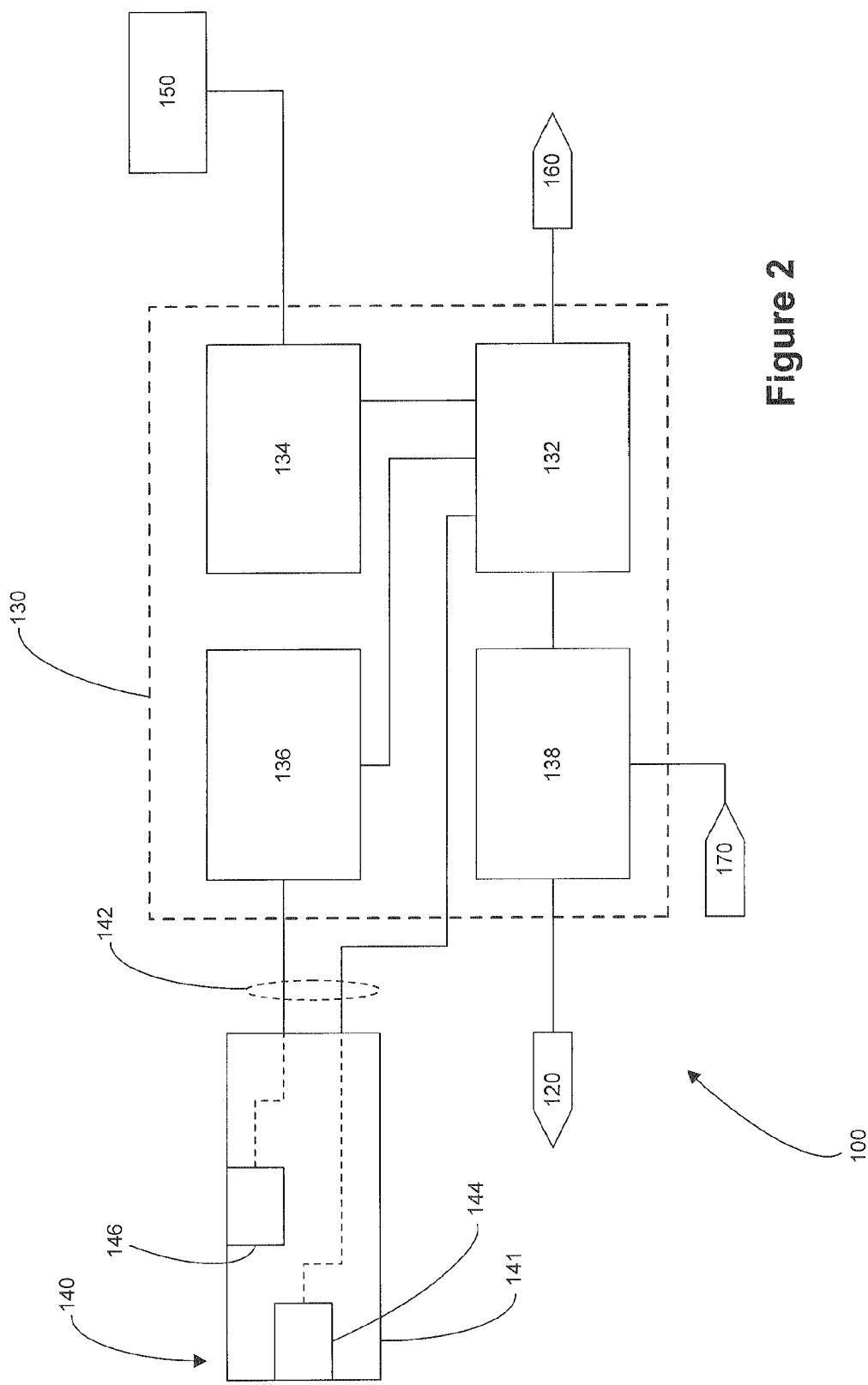
FIG. 2 is a block diagram a fluid level management apparatus.

One or more embodiments of a fluid level management system 100 are represented in FIGS. 1 and 2. An aquarium 110 is partially filled with a fluid such as water 112. A water pump/fill tube and/or line 122 is configured to supply additional water to the aquarium 110 via a pump 120 or other supply source. Pump 120 is coupled to a controller 130, which operates using electricity from a power source 150 (e.g., voltage and current from a wall plug). A fluid level sensor device 140 is attached to controller 130 using a cable 142. Cable 142 and/or fluid level sensor device 140 can be affixed to the upper edge, side or other location on, in or near aquarium 110 to maintain fluid level sensor device 140 in the same vertical position relative to the water level of aquarium 110. Fluid level sensor device 140 is coupled to a processing device (e.g., a microprocessor, FPGA, integrated circuit, ASIC, etc., such as the Microchip 12F675 microcontroller) in controller 130 to control operation of the pump 120 in a prescribed manner (e.g., according to one or more of the methods described below). Controller 130 and pump 120 operate cooperatively to manage the fluid level in aquarium 110 using one or more embodiments of fluid level management disclosed and/or claimed herein. In one or more embodiments shown in FIG. 2, microprocessor 132 can act as a failsafe, ensuring that the pump 120 does not operate incessantly or unnecessarily in the event of a system failure or other problem (e.g., power failure, component failure, cut line to/from microprocessor 132, etc.). Because system 100 can be programmed to permit the pump to operate only periodically (e.g., every 15 minutes, every 30 minutes, etc.) and with only limited fluid flow (e.g., only 50 ml or some other, predefined maximum flow amount), the pump life can be extended beyond what has been experienced with earlier systems that allowed the pump to cycle through on/off or start/stop switching too rapidly, thus burning out the pump prematurely.

Embodiments of a fluid level management system can include a controller 130 such as the one illustrated in the block diagram of FIG. 2, in which controller 130 has a microprocessor 132 (or other processing device) powered by a controller power supply 134 (which is coupled to power source 150, for example, and provides system 100 with 12V to 15V of DC current). Microprocessor 132 controls operation of a heating control unit 136 that, in turn, controls one or more heating elements 146 inside fluid level sensor device 140 (e.g., an appropriate configuration to control the heating of the fluid level sensor device 140, for example using 0.00029Kcal/hr). In some embodiments heating element 146 can be affixed to the inside of a stainless steel or other suitably heat conductive housing 141 (e.g., a "capsule" or the like) of fluid level sensor device 140 using epoxy or another appropriate adhesive. When switched on by unit 136, each heating element 146 heats the housing 141 of fluid level sensor device 140. For purposes of illustration, it is assumed that the sensor device housing 141 can reach a maximum temperature of 60° C. in air. Also affixed to the inside of the housing 141 of fluid level sensor device 140 is a temperature sensor 144 (e.g., an LM35D precision integrated-circuit temperature sensor, whose output voltage is linearly proportional to the Celsius temperature, made by National Semiconductor). Sensor 144 provides a temperature reading of housing 141 to microprocessor 132.

For purposes of illustration, it can be assumed that the amount of water in tank 110 will not fall below 20 cc and further that the water's temperature in tank 110 will be between 0° C. and 40° C. When fluid level sensor device 140 is completely immersed in water, its housing temperature will stabilize at the same temperature as the water 112 in the aquarium 110 (including, perhaps, a possible error of ±0.2° C.). For purposes of illustration, it can be assumed that the ambient air temperature surrounding aquarium 110 is between 0° C. and 50° C.

Microprocessor 132 acquires the temperature reading of sensor 144 and, after an appropriate hysteresis period, determines whether the temperature detected by sensor 144 is above a threshold temperature (again, this threshold temperature can be assumed to be 45° C. for purposes of illustration, as will be appreciated by those skilled in the art). If the temperature is above the threshold temperature, then microprocessor 132 activates pump 120 via pump control unit 138 in controller 130. In some embodiments, pump 120 operates for only short periods so that the amount of water added to aquarium 110 is not likely to cause an overflow. After one or more additions of water, microprocessor 132 can pause to allow the temperature of sensor device 140 to stabilize. After such a stabilization period, the temperature reading can again be consulted to see if fluid level sensor device 140 and/or housing 141 is now partially or completely immersed in water (in which case the temperature reading would fall below 45° C.). In some embodiments microprocessor 132 can also ensure that the temperature of device 140 and/or housing 141 does not exceed 60° C. or any other maximum allowable temperature). If the desired water level is not reached within in a prescribed period of time (e.g., a preselected number of reading/refilling cycles), then in some embodiments an alarm can be generated (visual and/or audible) to alert someone to the condition. The alarm can be part of a visual and/or audible display 160 to which microprocessor 132 is coupled. Once the proper fluid level is reached in a managed tank, the alarm can shut off automatically, if desired.

A user can reset the system 100 and/or set new operating parameters using a manual entry and control unit 170 in some embodiments. Generally, one or more embodiments use a sensor device temperature that is above room temperature so that such a temperature reading is a clear indication of the influence of the heating element 146 rather than mere ambient air.

As will be appreciated by those skilled in the art, the spacing between each heating element 146 and the temperature sensor 144 will determine how quickly sensor 144 can react to changes in the external fluid/air conditions of fluid level sensor device 140. If more substantial spacing is used, it will take longer for sensor 144 to detect increased heating of housing 141. This can be an advantage over earlier systems that detected changes over short periods of time (e.g., float-based systems in which the float might "bob" if waves or other water agitation was experienced, likewise with electrical conductivity-based systems like Lang et al. in which readings might fluctuate dramatically in a short period of time due to the rapid covering/uncovering of the sensor with fluid). By ensuring proper distancing of the heating element 146 and temperature sensor 144, the sensor device housing 141 will not heat up in the vicinity of the temperature sensor 144 unless fluid is absent for a longer period of time, thus avoiding false readings that might otherwise indicate low fluid level. The various spacing and temperature-based operating parameters of the heating element(s) 146 can be adjusted as appropriate, as will be appreciated by those skilled in the art.

Figure 3A:
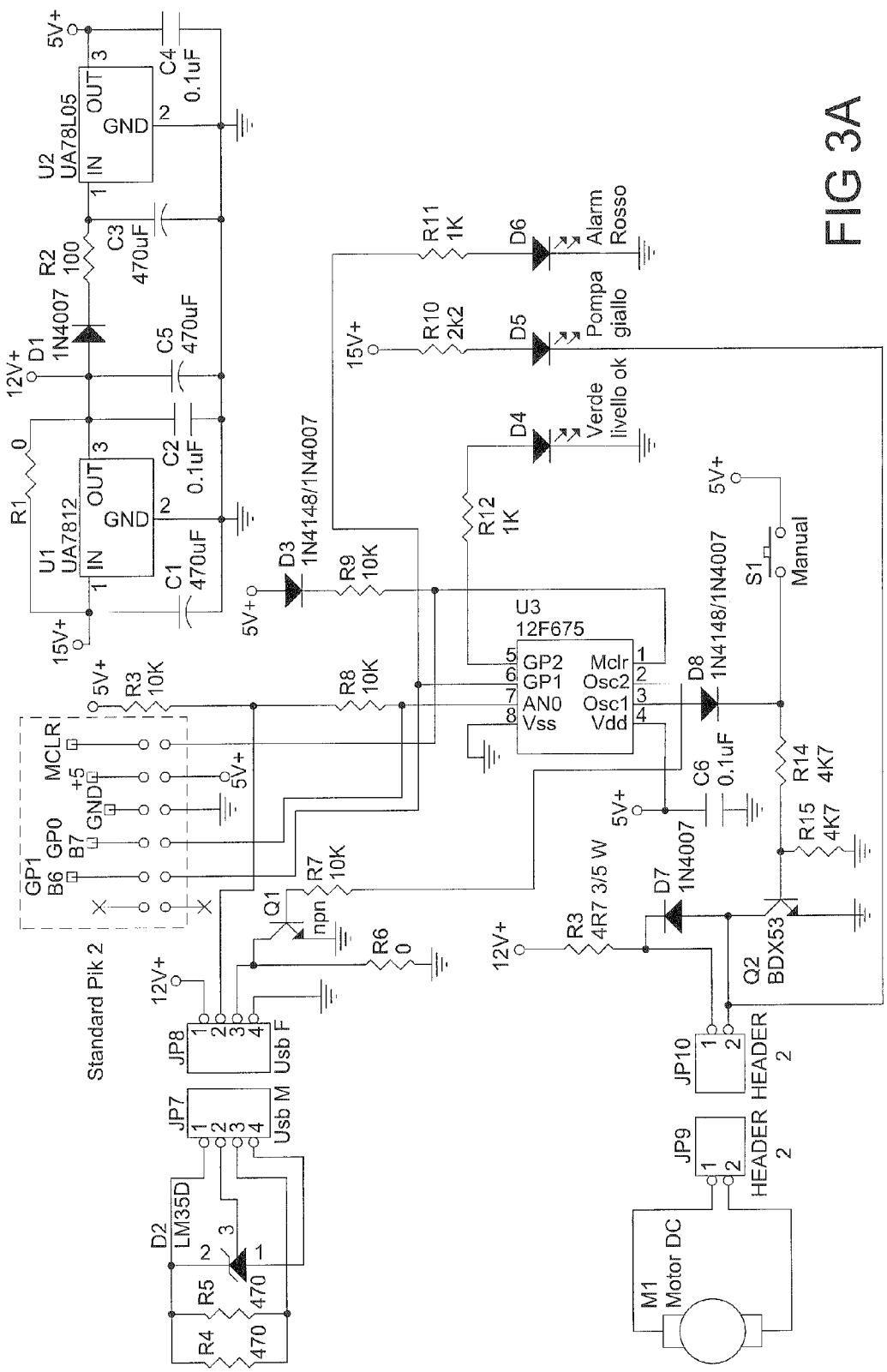
FIG. 3A is a schematic diagram of a fluid level management apparatus.

In some embodiments, display 160 can include a plurality of LEDs that flash or remain steady and use different colors. Thus various status/phase indications can be provided to users (e.g., preheating, alarm, pump running, low or high water level, etc.). The manual controls also can include manual operation of the pump 120 to allow a user to run the pump 120 as desired and without restrictions that might apply to controlled operation (e.g., shorter pulses and/or maximum fluid additions). FIGS. 3A and 3B illustrate an electrically-specific embodiment and parts list. Among other advantage, embodiments of fluid level management disclosed and claimed herein do not require the use of moving parts, reduce and/or minimize variations in salinity, maintain fluid level in a range of several millimeters, adapt to tanks/container of all sizes, and can maintain an alarm memory regardless of power failure, etc.

Sample instructions for one or more embodiments can be as follows:

Set-Up

Power connection: 110 to 240 volts from 50 to 60 Hz
Power Consumption: 15 W max (pump running)
a. Before connecting the fluid level controller and its accessories, find a clear and accessible place. The inside of the aquarium's cabinet is NOT an appropriate place to position the controller 130 and its power supply 150. Avoid exposing the control module 130 and power supply 150 to excessive splashing.
b. Make sure (1) that no water enters the unit flowing through the cables (e.g., create a loop on the cable); and (2) that the connecting cables extend well below the controller and the power supply so that in the event that water flows on the cables, it does not enter into sockets.
c. Avoid dropping the control module and power supply in water. If this occurs, immediately disconnect the unit from power.
d. Avoid use in hazardous conditions.

Operation a. Place the electronic controller 130 in a dry place.
b. Fill the desired level SUMP (in the SUMP it is suggested to place the sensor approximately 2-4 cm above the movement pumps/skimmer)
c. Through a bracket and two clamps, place the fluid level sensor 140 so that it is immersed for 1-3 mm, connect it to the controller 130 and fix all the cables with plastic clamps
d. Place the pump inside the RO tank making sure that the exit of the water hose is positioned well outside the water
e. Connect the power supply to the main supply. After 5 minutes the instrument is ready for operation. The controller 130 will be ready to maintain the correct fluid level and, if necessary, to replenish fluid through small additions (e.g., ~500 milliliters) every 30 minutes. Fluid can be manually replenished pressing the controller's M button.

Signals

Red LED: Level Alarm
    No RO water
    The pump may be damaged or clogged
    The tube may be blocked
Note: the occurrence of one of the states listed above will trigger the RED alarm LED ONLY after 5 hours from the start of the system.
Green LED: Correct Operation
    Quick flashing: at start and for the following 5 minutes
    Steady: fluid level is correct
    Slow flashing: level is low, controller performs the necessary top-ups (e.g., every 30 min.)
Yellow LED: Pump Operation
    Steady: pump is running
How to Use the Pump
    Pressing the M button activates pump. Useful, e.g., to top off or pouring from a can.

Notes

1) When device is turned ON it performs a test loop that allows visual verification of correct operation of the elements of the circuit: the LED will light up in succession for a short time, then also the pump will run for a short period. Verify that all components are operating properly.
2) No alarm will be activated if the sensor is not properly connected. Regularly verify proper connection of the sensor to the control module.
3) The first top up in case of low level will be made 5 minutes after the controller is switched on.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A fluid level management apparatus comprising:
    a fluid level sensor configured to be mounted to an aquarium containing water, the fluid level sensor device comprising:
        a heating element mounted to a heat conductive fluid level sensor housing;
        a temperature sensor mounted to the fluid level sensor housing at a location spaced from the heating element and configured to measure and generate a temperature reading representative of the temperature of the housing;
    a fluid pump configured to deliver water to an aquarium;

a controller comprising:
- a heating control unit coupled to the heating element and configured to control the temperature of the heating element;
- a pump control unit coupled to the pump and configured to control operation of the pump to deliver water to an aquarium; and
- a microprocessor configured to:
  - receive temperature readings from the temperature sensor;
  - control the temperature of the heating element; and
  - control the pump control unit based on the temperature readings received from the temperature sensor;
- wherein the controller operates the pump to add water to an aquarium when a preselected number of temperature readings from the fluid level sensor housing exceed a prescribed threshold temperature for a prescribed period of time, further wherein elevated temperature readings from the fluid level sensor housing represent a drop in water level in an aquarium.

2. The apparatus of claim 1 wherein the pump is configured to operate periodically and with limited fluid flow per operational period;
further wherein the microprocessor is configured to act as failsafe to prevent pump operation as a result of at least one of the following: system failure, power failure, component failure.

3. The apparatus of claim 2 wherein the temperature sensor generates an output voltage that is linearly proportional to the temperature of the fluid level sensor housing.

4. The apparatus of claim 3 wherein the threshold temperature is selected to represent a preselected drop in an aquarium water level wherein the aquarium water temperature is between 0° C. and 40° C.

5. The apparatus of claim 1 further comprising an alarm configured to activate when a preselected number of temperature readings from the fluid level sensor housing exceed a prescribed threshold temperature for a prescribed period of time and represent a failure to reach a desired water level in an aquarium;
wherein the alarm comprises at least one of the following: an audible alarm, a visual display.

6. The apparatus of claim 1 further comprising a manual entry and control unit configured to allow setting of operational parameters of the fluid level management apparatus.

7. The apparatus of claim 1 wherein the threshold temperature is higher than 44° C.

8. The apparatus of claim 4 further comprising an alarm configured to activate when a preselected number of temperature readings from the fluid level sensor housing exceed a prescribed threshold temperature for a prescribed period of time and represent a failure to reach a desired water level in an aquarium;
wherein the alarm comprises at least one of the following: an audible alarm, a visual display.

9. The apparatus of claim 8 further comprising a manual entry and control unit configured to allow setting of operational parameters of the fluid level management apparatus.

10. The apparatus of claim 9 configured to provide a stabilization period after a preselected number of pump operations, the stabilization period configured to allow the temperature of the fluid level sensor housing to stabilize.

11. A method for managing the water level in an aquarium, the method comprising:
- mounting a sensor device housing to an aquarium tank configured to hold water at a level that engages the sensor device housing;
- heating the sensor device housing;
- providing a temperature measurement of the sensor device housing to a microprocessor;
- the microprocessor determining whether the sensor device housing temperature is above or below a threshold temperature, wherein the threshold temperature defines a temperature below which indicates that the sensor device housing is substantially or completely immersed in water and above which indicates that the sensor device housing is substantially or completely exposed to air; and
- when the temperature measurement provided to the microprocessor exceeds the threshold temperature, supplying additional water to the tank.

12. The method of claim 11 wherein the microprocessor is part of a controller and is coupled to a heating element control unit and to a pump control unit.

13. The method of claim 12 wherein water is supplied to the tank by a pump that is configured to supply only a limited amount of water in a prescribed time period to prevent tank overflow.

14. The method of claim 13 wherein the threshold temperature is above 40° C.

15. The method of claim 14 wherein the pump is configured to operate on a limited basis with regard to at least one of the following: frequency of operation, length of operation, maximum fluid flow during operation.

* * * * *